(12) United States Patent
Huang et al.

(10) Patent No.: US 10,930,243 B2
(45) Date of Patent: Feb. 23, 2021

(54) METHOD AND SYSTEM FOR ADJUSTING UNIFORMITY OF IMAGE COLOR TONES BY USING A TRANSLUCENT UNIFORMITY COMPENSATED IMAGE LAYER

(71) Applicants: BenQ Intelligent Technology (Shanghai) Co., Ltd, Shanghai (CN); BENQ CORPORATION, Taipei (TW)

(72) Inventors: Guo-Rong Huang, Taipei (TW); Hsiu-Fang Liu, Taipei (TW); Yi-Ho Bai, Taipei (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 0 days.

(21) Appl. No.: 16/556,220

(22) Filed: Aug. 29, 2019

(65) Prior Publication Data
US 2020/0143768 A1   May 7, 2020

(30) Foreign Application Priority Data

Nov. 1, 2018   (CN) .......................... 2018 1 1293385

(51) Int. Cl.
| | |
|---|---|
| *G09G 5/02* | (2006.01) |
| *G09G 5/04* | (2006.01) |
| *G01J 3/46* | (2006.01) |
| *G01J 3/50* | (2006.01) |
| *H04N 1/60* | (2006.01) |

(Continued)

(52) U.S. Cl.
CPC .............. *G09G 5/026* (2013.01); *G01J 3/465* (2013.01); *G01J 3/506* (2013.01); *G09G 5/04* (2013.01); *G09G 5/10* (2013.01); *G09G 2320/0242* (2013.01); *G09G 2320/0666* (2013.01); *G09G 2320/0693* (2013.01)

(58) Field of Classification Search
CPC combination set(s) only.
See application file for complete search history.

(56) References Cited

U.S. PATENT DOCUMENTS

| | | | |
|---|---|---|---|
| 6,480,175 B1 | 11/2002 | Schneider | |
| 2011/0188744 A1* | 8/2011 | Sun | H04N 5/2355 382/162 |

(Continued)

FOREIGN PATENT DOCUMENTS

TW    201514949 A    4/2015

*Primary Examiner* — Wesner Sajous
(74) *Attorney, Agent, or Firm* — Winston Hsu

(57) ABSTRACT

A method for adjusting uniformity of image color tones includes setting brightness of a darkest display region as target brightness and setting color temperature coordinates of a designated display region as target color temperature coordinates of at least one part of display regions of a display, comparing the brightness and the color temperature coordinates of each display region of the at least one part of display regions with the target brightness and the target color temperature coordinates for generating a first calibrated color tone, generating a second calibrated color tone of the each display region of the at least one part of display regions according to an Alpha channel parameter and the first calibrated color tone, generating a uniformity compensated image layer according to all second calibrated color tones, and virtually overlaying the uniformity compensated image layer on the at least one part of display regions.

22 Claims, 6 Drawing Sheets

(51) Int. Cl.
*H04N 5/57* (2006.01)
*H04N 5/58* (2006.01)
*H04N 9/64* (2006.01)
*H04N 9/69* (2006.01)
*H04N 9/77* (2006.01)
*H04N 1/58* (2006.01)
*G09G 5/10* (2006.01)

(56) References Cited

U.S. PATENT DOCUMENTS

| | | | |
|---|---|---|---|
| 2017/0192733 A1* | 7/2017 | Huang | G06F 3/1446 |
| 2017/0358064 A1* | 12/2017 | Hendry | G06T 7/11 |
| 2018/0182081 A1* | 6/2018 | Chesnokov | G06T 5/50 |
| 2018/0218481 A1* | 8/2018 | Evans | H04N 5/20 |

* cited by examiner

| | | | | |
|---|---|---|---|---|
| R1($x_1$, $y_1$, $Y_1$)=<br>(0.3077, 0.3230,<br>164.348) | R2($x_2$, $y_2$, $Y_2$)=<br>(0.3095, 0.3234,<br>165.960) | R3($x_3$, $y_3$, $Y_3$)=<br>(0.3098, 0.3229,<br>174.869) | R4($x_4$, $y_4$, $Y_4$)=<br>(0.3104, 0.3177,<br>165.713) | R5($x_5$, $y_5$, $Y_5$)=<br>(0.3089, 0.3128,<br>155.921) |
| R6($x_6$, $y_6$, $Y_6$)=<br>(0.3060, 0.3220,<br>166.337) | R7($x_7$, $y_7$, $Y_7$)=<br>(0.3063, 0.3271,<br>184.229) | R8($x_8$, $y_8$, $Y_8$)=<br>(0.3065, 0.3211,<br>188.315) | R9($x_9$, $y_9$, $Y_9$)=<br>(0.3078, 0.3176,<br>181.627) | R10($x_{10}$, $y_{10}$, $Y_{10}$)=<br>(0.3080, 0.3131,<br>156.142) |
| R11($x_{11}$, $y_{11}$, $Y_{11}$)=<br>(0.3073, 0.3222,<br>173.807) | R12($x_{12}$, $y_{12}$, $Y_{12}$)=<br>(0.3074, 0.3218,<br>197.444) | R13($x_{13}$, $y_{13}$, $Y_{13}$)=<br>(0.3079, 0.3210,<br>197.768) | R14($x_{14}$, $y_{14}$, $Y_{14}$)=<br>(0.3084, 0.3176,<br>190.639) | R15($x_{15}$, $y_{15}$, $Y_{15}$)=<br>(0.3082, 0.3123,<br>161.708) |
| R16($x_{16}$, $y_{16}$, $Y_{16}$)=<br>(0.3070, 0.3223,<br>176.712) | R17($x_{17}$, $y_{17}$, $Y_{17}$)=<br>(0.3074, 0.3218,<br>196.368) | R18($x_{18}$, $y_{18}$, $Y_{18}$)=<br>(0.3068, 0.3201,<br>192.022) | R19($x_{19}$, $y_{19}$, $Y_{19}$)=<br>(0.3086, 0.3179,<br>185.880) | R20($x_{20}$, $y_{20}$, $Y_{20}$)=<br>(0.3081, 0.3117,<br>168.271) |
| R21($x_{21}$, $y_{21}$, $Y_{21}$)=<br>(0.3053, 0.3204,<br>170.745) | R22($x_{22}$, $y_{22}$, $Y_{22}$)=<br>(0.3069, 0.3216,<br>180.518) | R23($x_{23}$, $y_{23}$, $Y_{23}$)=<br>(0.3055, 0.3192,<br>169.478) | R24($x_{24}$, $y_{24}$, $Y_{24}$)=<br>(0.3083, 0.3182,<br>170.028) | R25($x_{25}$, $y_{25}$, $Y_{25}$)=<br>(0.3081, 0.3118,<br>161.099) |

FIG. 3

| R1(R₁, G₁, B₁)= (249, 248, 250) | R2(R₂, G₂, B₂)= (249, 245, 247) | R3(R₃, G₃, B₃)= (240, 241, 243) | R4(R₄, G₄, B₄)= (243, 239, 241) | R5(R₅, G₅, B₅)= (245, 242, 243) |
|---|---|---|---|---|
| R6(R₆, G₆, B₆)= (247, 247, 236) | R7(R₇, G₇, B₇)= (237, 235, 229) | R8(R₈, G₈, B₈)= (228, 227, 229) | R9(R₉, G₉, B₉)= (228, 228, 238) | R10(R₁₀, G₁₀, B₁₀)= (238, 236, 244) |
| R11(R₁₁, G₁₁, B₁₁)= (240, 241, 244) | R12(R₁₂, G₁₂, B₁₂)= (234, 232, 233) | R13(R₁₃, G₁₃, B₁₃)= (221, 228, 229) | R14(R₁₄, G₁₄, B₁₄)= (237, 230, 231) | R15(R₁₅, G₁₅, B₁₅)= (246, 244, 243) |
| R16(R₁₆, G₁₆, B₁₆)= (243, 249, 246) | R17(R₁₇, G₁₇, B₁₇)= (235, 238, 235) | R18(R₁₈, G₁₈, B₁₈)= (227, 231, 226) | R19(R₁₉, G₁₉, B₁₉)= (231, 235, 233) | R20(R₂₀, G₂₀, B₂₀)= (242, 245, 243) |
| R21(R₂₁, G₂₁, B₂₁)= (247, 255, 246) | R22(R₂₂, G₂₂, B₂₂)= (249, 255, 247) | R23(R₂₃, G₂₃, B₂₃)= (245, 252, 244) | R24(R₂₄, G₂₄, B₂₄)= (241, 248, 239) | R25(R₂₅, G₂₅, B₂₅)= (246, 253, 244) |

FIG. 4

METHOD AND SYSTEM FOR ADJUSTING UNIFORMITY OF IMAGE COLOR TONES BY USING A TRANSLUCENT UNIFORMITY COMPENSATED IMAGE LAYER

BACKGROUND OF THE INVENTION

1. Field of the Invention

The present invention illustrates a method and a system for adjusting uniformity of image color tones, and more particularly, a method and a system for adjusting uniformity of image color tones by using a translucent uniformity compensated image layer overlaid on a raw image layer.

2. Description of the Prior Art

Liquid crystal display (LCD) devices and organic light emitting diode (OLED) devices have been widely used in our daily life because they take advantages of thin appearance, low power consumption, and no radiation. For example, the LCD devices and OLED devices can be applied to multimedia players, mobile phones, personal digital assistants, computer monitors, or flat-screen TVs. However, since the display devices are manufactured by using different processes or designed by different configurations, images displayed by different display devices may suffer from color offset effects, such as a color tone offset effect, a white balance offset effect, a hue offset effect, and a brightness offset effect. These color offset effects result in unpleasant image color or distorted image color.

When the color offset effects of the display device occur, several methods for mitigating the color offset effects are introduced. In a first method, the user enables an on screen display (OSD) function for manually adjusting various display parameters. In a second method, the display device uses a dedicated compensation circuit or a hardware loop for controlling brightness values, color tone values, and white balance values of the displayed images. In a third method, the user manually uses an image capturing device (i.e., a color analyzer) for closely approaching a small area of the screen in order to sample optical characteristics. Then, the user gradually adjusts color tones of the displayed images by moving the image capturing device repeatedly for sampling all optical characteristics of all areas of the screen. In conventional color offset mitigation methods, the display device requires additional hardware circuits. Further, the user can only subjectively adjust the display parameters perceived by using their naked eyes. Therefore, when the color offset effects of the display device occur, it requires a long processing time for gradually adjusting the displayed parameters. Further, the display device capable of adjusting the color offset effects may increase in size, cost, and power consumption due to high hardware complexity.

SUMMARY OF THE INVENTION

In an embodiment of the present invention, a method for adjusting uniformity of image color tones is disclosed. The method comprises setting brightness of a darkest display region of at least one part of display regions of a display as target brightness, setting color temperature coordinates of a designated display region of the at least one part of display regions of the display as target color temperature coordinates, comparing the brightness and the color temperature coordinates of each display region of the at least one part of display regions with the target brightness and the target color temperature coordinates for generating a first calibrated color tone of the each display region, generating a second calibrated color tone of the each display region of the at least one part of display regions by using a transfer function according to an Alpha channel parameter and the first calibrated color tone, generating a uniformity compensated image layer of all pixels of the at least one part of display regions according to all second calibrated color tones, and virtually overlaying the uniformity compensated image layer on the at least one part of display regions for generating a displayed image with uniform color tones on the at least one part of display regions.

In another embodiment of the present invention, a system for adjusting uniformity of image color tones is disclosed. The system comprises a display, an optical sensor, and a processor. The display is configured to display images. The optical sensor is configured to detect a plurality of optical characteristics of at least one part of display regions of the display. The processor is coupled to the display and the optical sensor and configured to adjust the uniformity of the image color tones of the at least one part of display regions according to the plurality of optical characteristics of the at least one part of display regions. The processor sets brightness of a darkest display region of the at least one part of display regions of the display as target brightness, sets color temperature coordinates of a designated display region of the at least one part of display regions of the display as target color temperature coordinates, compares the brightness and the color temperature coordinates of each display region of the at least one part of display regions with the target brightness and the target color temperature coordinates for generating a first calibrated color tone of the each display region, generates a second calibrated color tone of the each display region of the at least one part of display regions by using a transfer function according to an Alpha channel parameter and the first calibrated color tone, generates a uniformity compensated image layer of all pixels of the at least one part of display regions according to all second calibrated color tones, and virtually overlays the uniformity compensated image layer on the at least one part of display regions for generating a displayed image with uniform color tones on the at least one part of display regions.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is an illustration of acquiring optical characteristics of each display region of the display by using an optical sensor of the system in FIG. 1.

FIG. 4 is an illustration of generating a calibrated color tone of each display region of the display of the system in FIG. 1.

DETAILED DESCRIPTION

Figure 1:
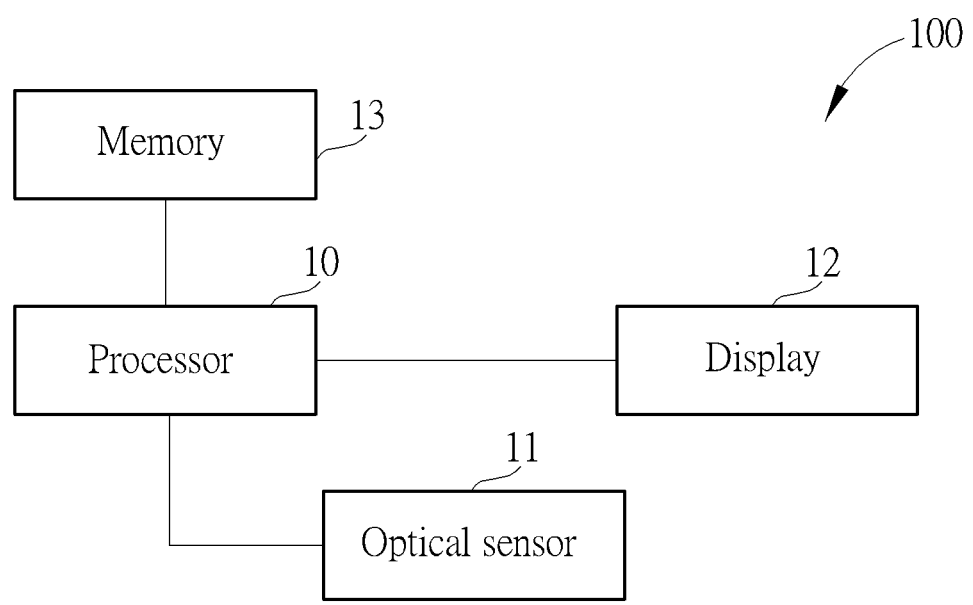
FIG. 1 is a structure of a system for adjusting uniformity of image color tones according to an embodiment of the present invention.

FIG. 1 is a structure of a system 100 for adjusting uniformity of image color tones according to an embodiment of the present invention. The system 100 includes a processor 10, an optical sensor 11, a display 12, and a memory 13. The display 12 is used for displaying images. The display 12 can be any type of displays, such as a liquid crystal display (LCD) or an organic light emitting diode (OLED) display. The optical sensor 11 is used for detecting a plurality of optical characteristics of at least one part of display regions of the display (i.e., display regions R1 to R25 in FIG. 2). The optical sensor 11 can also be used for detecting all display regions of the display. For simplicity, display regions R1 to R25 and their optical characteristics are introduced to the system 100 hereafter. The optical sensor 11 can be any device capable of detecting light signals. For example, the optical sensor 11 can be a color analyzer with software development kits (SDK) or an optical measuring instrument for generating color coordinates in a color space defined by an International Commission on Illumination (i.e., CIE color space) according to the light signals. The CIE color space can be generated in form of CIE1931 color coordinates, denoted as three dimensional color coordinates (x, y, Y). Here, for the CIE1931 color coordinates (x, y, Y), elements (x, y) correspond to coordinates of a color temperature characteristic of the image. An element Y corresponds to the brightness of the image. The processor 10 is coupled to the display 12 and the optical sensor 11 for adjusting the uniformity of the image color tones of the at least one part of display regions according to the plurality of optical characteristics of the at least one part of display regions. The processor 10 can be any type of processing devices, such as a central processing unit (CPU), a processing chip, a microprocessor, or a programmable logic computing device. In the system 100, data communications can be performed between the optical sensor 11 and the processor 10 through a cable. The cable can be a universal serial bus (USB) adapter cable or an RS232 data format adapter cable. The processor 10 can use another cable for communicating with the display 12. The memory 13 is coupled to the processor 10 for saving data of an application program and an operating system (OS). The application program can be executed under the operating system. The operating system can include a computer operating system (i.e., Microsoft® Windows OS) or a smartphone operating system (i.e., Android® OS or Apple® OS). The processor 10 can be driven by the application program installed in the memory 13. However, any hardware or technology modification falls into the scope of the present invention. For example, wireless data communications can be applied between the optical sensor 11 and the processor 10. The processor 10 can be an external server computer or a CPU of the smartphone. The processor 10 can be an internal processing chip of the display 12, such as a scaler inside the display 12. The processor 10 can directly control the color tones of the images of the display 12 through a motherboard inside the display 12. The memory 13 can be integrated with the processor 10. The memory 13 can be a nonvolatile memory unit disposed on a motherboard of the display 12. In the system 100, the optical sensor 11 can detect brightness and color temperature coordinates of each display region of the display 12. Then, the processor 10 can set brightness of a darkest display region of the at least one part of display regions of the display 12 as target brightness. Further, the processor 10 can set color temperature coordinates of a designated display region of the at least one part of display regions of the display as target color temperature coordinates. The designated display region can be determined by a designer according to actual conditions. Then, the processor 10 can compare the brightness and the color temperature coordinates of each display region of the at least one part of display regions with the target brightness and the target color temperature coordinates for generating a first calibrated color tone of the each display region. Here, the first calibrated color tone is irrelevant to transparency, and can be regarded as an initial color tone for compensating the each display region. Then, the processor 10 can generate a second calibrated color tone of the each display region of the at least one part of display regions by using a transfer function according to an Alpha channel parameter and the first calibrated color tone. Then, the processor 10 can generate a uniformity compensated image layer of all pixels of the at least one part of display regions according to all second calibrated color tones. In other words, the uniformity compensated image layer can be regarded as a translucent mask generated by the processor 10 through the application program. Finally, the processor 10 can virtually overlay the uniformity compensated image layer on the at least one part of display regions for generating a displayed image with uniform color tones on the at least one part of display regions. Details of the method for adjusting uniformity of image color tones are illustrated below.

Figure 2:
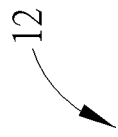
FIG. 2 is an illustration of generating a plurality of display regions of a display of the system in FIG. 1.

FIG. 2 is an illustration of generating a plurality of display regions R1 to R25 of the display 12 of the system 100. As previously mentioned, the system 100 can use the application program installed in the memory 13 for controlling the processor 10 to adjust the uniformity of color tones. Therefore, the system 100 can use the application program for generating an allocation interface of all display regions of the display 12. Then, the user can control the processor 10 for setting M intervals of a display panel of the display 12 in a horizontal direction through the allocation interface. Further, the user can control the processor 10 for setting N intervals of the display panel of the display in a vertical direction through the allocation interface. The M intervals in the horizontal direction and the N intervals in the vertical direction can be used for partitioning the display panel into M×N display regions. M and N are two positive integers greater than one. The each display region of the at least one part of display regions can be a rectangular region. However, for simplicity, M and N are configured as two constant values equal to 5. The M×N display regions are denoted as a display region R1 to a display region R25. Further, shapes of the display region R1 to the display region R25 can be identical. Each display region includes a plurality of pixels. Here, optical characteristics such as the color temperature coordinates, the brightness, or the color tone of the each display region can be regarded as a result of averaging specific optical characteristics of all pixels by using the optical sensor 11.

FIG. 3 is an illustration of acquiring optical characteristics of each display region of the display 12 by using the optical sensor 11 of the system 100. As previously mentioned, when M and N are configured as the two constant values equal to 5, the display 12 has 25 display regions, denoted as the display region R1 to the display region R25. Therefore, after the optical sensor 11 establishes a data link to the processor 10 successfully, the application program can generate a detection window including the display region R1 to the display region R25. Then, the user can hold the optical sensor 11 for detecting the optical characteristics of the 25 display regions gradually. For example, when the user holds the optical sensor 11 to approach a certain display region for detecting its optical characteristics, the processor 10 can control the display 12 to generate at least one testing image of the display region. Configurations of the at least one testing image can be shown in Table T1.

TABLE T1

| R(red) | G(green) | B(blue) |
|--------|----------|---------|
| 255 | 255 | 255 |
| 245 | 245 | 245 |
| 235 | 235 | 235 |

The at least one testing image corresponds to at least one color combination of three primary colors. For example, (R, G, B)=(255, 245, 235) corresponds to a testing image. (R, G, B)=(255, 235, 245) corresponds to another testing image. P testing images can be generated for detecting each display region of the display 12. P is greater than or equal to one. An upper bound of P is determined by a maximum combination amount of the three primary colors in Table T1. After the at least one testing image is generated, the processor 10 can generate brightness and color temperature coordinates of the each display region according to a testing result of the least one testing image.

Further, the processor 10 can convert the testing result of the least one testing image to the brightness and the color temperature coordinates of the each display region by using a linear function, a non-linear function, or a matrix. As shown in FIG. 3, the optical sensor 11 can detect the optical characteristics of the display region R1 to the display region R25. Further, the optical characteristics (i.e., such as color temperature coordinates and color tone values) can be presented as color coordinates in a color space defined by an International Commission on Illumination (i.e., CIE color space). For example, for the CIE color space, color coordinates of the display region R1 can be written as R1 $(x_1, y_1, y_1)$=(0.3077, 0.3230, 164.348). The color coordinates R1 $(x_1, y_1, Y_1)$=(0.3077, 0.3230, 164.348) of the display region R1 imply that color temperature coordinates of the display region R1 are denoted as $(x_1, y_1)$=(0.3077, 0.3230). Brightness of the display region R1 is denoted as $Y_1$=164 0.348. Color coordinates of the display region R2 can be written as R2 $(x_2, y_2, Y_2)$=(0.3095, 0.3234, 165.960). The color coordinates R2 $(x_2, Y_2, Y_2)$=(0.3095, 0.3234, 165.960) of the display region R2 imply that color temperature coordinates of the display region R2 are denoted as $(x_2, y_2)$=(0.3095, 0.3234). Brightness of the display region R2 is denoted as $Y_2$=165.960. Color coordinates of the display region R25 can be written as R25 $(x_{25}, y_{25}, y_{25})$=(0.3081, 0.3118, 161.099). The color coordinates R25 $(x_{25}, y_{25}, y_{25})$=(0.3081, 0.3118, 161.099) of the display region R25 imply that color temperature coordinates of the display region R25 are denoted as $(x_{25}, Y_{25})$=(0.3081, 0.3118). Brightness of the display region R25 is denoted as $Y_{25}$=161.099. Then, the processor 10 can set brightness of a darkest display region as target brightness. Further, the processor 10 can set color temperature coordinates of a designated display region as target color temperature coordinates. For example, after all optical characteristics of the 25 display regions are acquired by the processor 10, the processor 10 can determine the display region R5 with brightness $Y_5$=155.921 as the darkest display region of the 25 display regions. Then, the processor 10 can set the brightness $Y_5$=155.921 as the target brightness. Further, the processor 10 can set a center display region as the designated display region, such as the display region R13. Then, the processor 10 can set color temperature coordinates of the display region R13 as the target color temperature coordinates $(X_{13}$=0.3079, $y_{13}$=0.3210).

However, configurations of the target brightness and the target color temperature coordinates are not limited to using the aforementioned method. For example, the processor 10 can set any display region other than the center display region as the designated display region. Any reasonable technology modification falls into the scope of the present invention. In general, the center display region R13 has high uniformity of image color tones. However, the designated display region of the display 12 can be determined according to optical detection results of all display regions.

FIG. 4 is an illustration of generating a calibrated color tone of each display region of the display 12 of the system 100. As previously mentioned, the processor 10 can determine the display region R5 with brightness $Y_5$=155.921 as the darkest display region of the 25 display regions. The processor 10 can set the brightness $Y_5$=155.921 as the target brightness. The processor 10 can set color temperature coordinates of the display region R13 as the target color temperature coordinates $(X_{13}$=0.3079, $y_{13}$=0.3210). In the system 100, since all optical characteristics of the 25 display regions R1 to R25 can be detected, if the target brightness and the target color temperature coordinates are determined, the processor 10 can compare the brightness and the color temperature coordinates of each display region of the at least one part of display regions with the target brightness and the target color temperature coordinates for generating a first calibrated color tone of the each display region. The first calibrated color tone can be regarded as a compensated value for compensating the original color tone of each display region to approach target color tone (i.e., target brightness and/or target color temperature coordinates) of the each display region. The first calibrated color tone can be generated in form of color coordinates of the three primary colors (RGB). For example, in FIG. 4, a first calibrated color tone of the display region R1 can be written as R1 $(R_1, G_1, B_1)$=(249, 248, 250). A first calibrated color tone of the display region R2 can be written as R2 $(R_2, G_2, B_2)$=(249, 245, 247), and so on. A first calibrated color tone of the display region R25 can be written as R25 $(R_{25}, G_{25}, B_{25})$=(246, 253, 244). Further, after all first calibrated color tones of the display region R1 to the display region R25 are generated, the processor 10 can use an average interpolation process for generating calibrated values of all pixels of all display regions (R1 to R25). The processor 10 can save calibrated values of all pixels of the at least one part of display regions as a calibrated image layer. In other words, the application program can control the processor 10 to generate the calibrated image layer and then save the calibrated image layer as a data file to the memory 13.

Here, the first calibrated color tone can be located in a color space of three primary colors (RGB color space). Further, the processor 10 can generate the Alpha channel parameter according to all calibrated color tones of all display regions (R1 to R25). The Alpha channel parameter falls into a range from 0 to 255. The Alpha channel parameter can also be expressed in form of a percentage value. For example, when an Alpha channel parameter is equal to 0% (or can be expressed as "0"), it implies that a pixel with the Alpha channel parameter is a completely transparent pixel. The visible light can directly penetrate through this pixel to subsequent image layers. When an Alpha channel parameter is equal to 100% (or can be expressed as "255"), it implies that a pixel with the Alpha channel parameter is a completely opaque pixel. The visible light cannot penetrate through this pixel to the subsequent image layers. Since the Alpha channel parameter can be regarded a transparency parameter, it is also an important factor of adjusting the compensation effect. In the system 100, the Alpha channel parameter can be defined as a maximum difference between a plurality of color coordinates and white color coordinates. The plurality of color coordinates corresponds to all first calibrated color tones of the at least one part of display regions. For example, in FIG. 4, the Alpha channel parameter can be defined as a maximum difference between all calibrated color tones (i.e., R1 ($R_1$, $G_1$, $B_1$), R2 ($R_2$, $G_2$, $B_2$)/R3 ($R_3$, $G_3$, $B_3$), ..., R25 ($R_{25}$, $G_{25}$, $B_{25}$)) and the white color tone (R=255, G=255, B=255). Therefore, the Alpha channel parameter in FIG. 4 can be derived as 255−221=34. Here, "221" can be selected as a color gain of a red color ($R_{13}$=221) of the display region R13. After the Alpha channel parameter is determined, the processor 10 can generate a second calibrated color tone of the each display region by using a transfer function according to the Alpha channel parameter and the first calibrated color tone. The transfer function can be an Alpha blending function. For example, the second calibrated color tone can be generated in a form of:

$$(R_{OUT}, G_{OUT}, B_{OUT}) = \frac{(R_{IN}, G_{IN}, B_{IN}) - 255 \times [(255 - \alpha)/255]}{1 - [(255 - \alpha)/255]}$$

($R_{IN}$, $G_{IN}$, $B_{IN}$) is the first calibrated color tone. α is the Alpha channel parameter. ($R_{OUT}$, $G_{OUT}$, $B_{OUT}$) is the second calibrated color tone. For example, in FIG. 4, ($R_{IN}$, $G_{IN}$, $B_{IN}$) of the Alpha blending function can be substituted with the first calibrated color tone R1 ($R_1$, $B_1$, $G_1$)=(249, 248, 250) for generating ($R_{OUT}$, $G_{OUT}$, $B_{OUT}$). Therefore, the ($R_{OUT}$, $G_{OUT}$, $B_{OUT}$) can be regarded as a second calibrated color tone of the display region R1. Similarly, all first calibrated color tones (RGB color space) can be updated as second calibrated color tones by using the Alpha blending function. Therefore, each second calibrated color tone is located in the color space of three primary colors (RGB color space). Then, the processor 10 can generate the uniformity compensated image layer according to all second calibrated color tones of the display regions R1 to R25. In other words, the processor 10 can adjust transparency of the calibrated image layer (i.e., as shown in FIG. 4) according to the Alpha channel parameter for generating the uniformity compensated image layer. Therefore, the uniformity compensated image layer can be regarded as a translucent mask generated by using the application program. Further, the uniformity compensated image layer can be saved in the memory 13 as an image file of Portable Network Graphics (PNG) format with the Alpha channel parameter. Further, the Alpha channel parameter can be manually adjusted by the user, or determined by a designer according to actual conditions. Details of various configurations of the Alpha channel parameter are omitted here.

Figure 5:
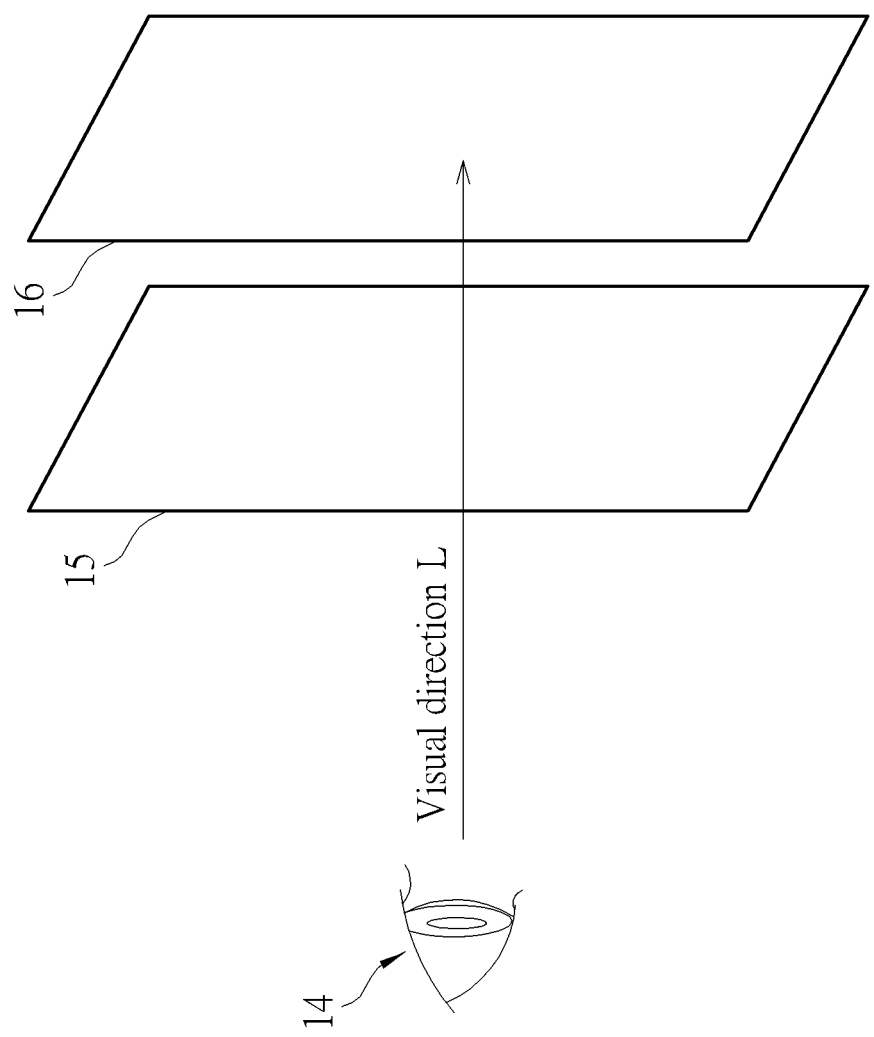
FIG. 5 is an illustration of virtually overlaying a uniformity compensated image layer on the display regions for generating a displayed image with uniform color tones of the system in FIG. 1.

FIG. 5 is an illustration of virtually overlaying the uniformity compensated image layer 15 on a raw image layer 16 displayed on the display regions R1 to R25 for generating a displayed image with uniform color tones received by human eyes 14. As previously mentioned, the method for adjusting uniformity of image color tones can be performed by the system 100 with an assisting application program. Therefore, after the uniformity compensated image layer 15 is saved as the image file of the PNG format, when the display 12 displays the image, the uniformity compensated image layer 15 can be outputted from the memory 13 and overlaid on the raw image layer 16 displayed on the display regions R1 to R25. By doing so, the human eyes 14 can receive the image with uniform color tones displayed on the display regions R1 to R25 through the uniformity compensated image layer 15. In other words, although initial color tones of the raw image layer 16 are non-uniform, the human eyes 14 can receive the image layer with uniform color tones by overlaying the uniformity compensated image layer 15 on the raw image layer 16. Therefore, a quality of visual experience can be improved.

Figure 6:
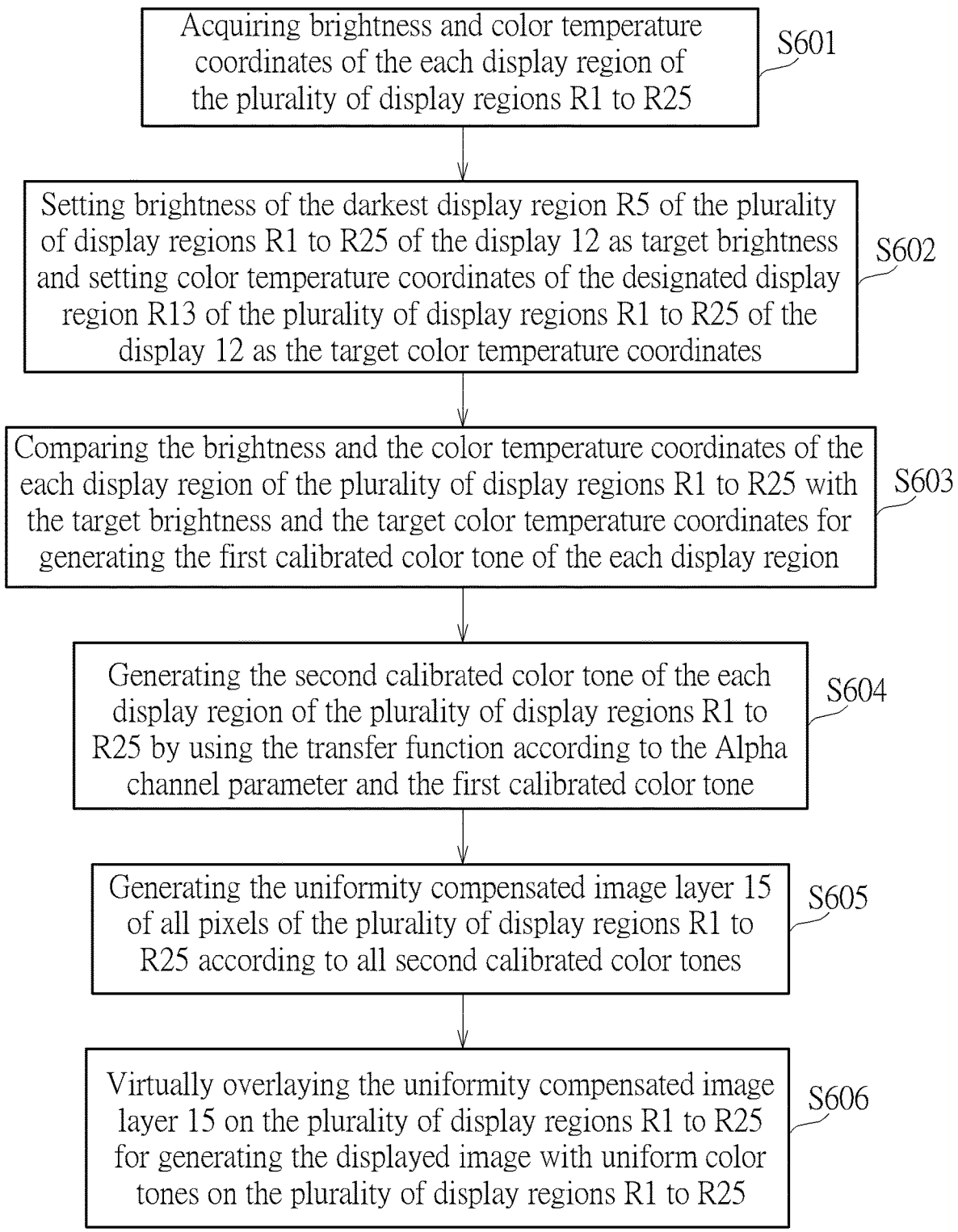
FIG. 6 is a flow chart of a method for adjusting uniformity of image color tones performed by the system in FIG. 1.

FIG. 6 is a flow chart of the method for adjusting the uniformity of image color tones performed by the system 100. The method for adjusting the uniformity of image color tones can include step S601 to step S606. Any reasonable technology modification falls into the scope of the present invention. Step S601 to step S606 can be illustrated below.

step S601: acquiring brightness and color temperature coordinates of the each display region of the plurality of display regions R1 to R25;

step S602: setting brightness of the darkest display region R5 of the plurality of display regions R1 to R25 of the display 12 as target brightness and setting color temperature coordinates of the designated display region R13 of the plurality of display regions R1 to R25 of the display 12 as the target color temperature coordinates;

step S603: comparing the brightness and the color temperature coordinates of the each display region of the plurality of display regions R1 to R25 with the target brightness and the target color temperature coordinates for generating the first calibrated color tone of the each display region;

step S604: generating the second calibrated color tone of the each display region of the plurality of display regions R1 to R25 by using the transfer function according to the Alpha channel parameter and the first calibrated color tone;

step S605: generating the uniformity compensated image layer 15 of all pixels of the plurality of display regions R1 to R25 according to all second calibrated color tones;

step S606: virtually overlaying the uniformity compensated image layer 15 on the plurality of display regions R1 to R25 for generating the displayed image with uniform color tones on the plurality of display regions R1 to R25.

Details of step S601 to step S606 are previously illustrated. Thus, they are omitted here. However, "the plurality of display regions R1 to R25" in step S601 to step S606 can be replaced with "at least one part of display regions R1 to R25" of the display 12. In other words, the optical sensor 11 can be used for detecting optical characteristics of certain display regions of the display 12, such as display regions with odd indices or even indices of the display 12. Then, processor 10 can use an interpolation process or an extrapolation process for generating calibrated values of all pixels of all display regions R1 to R25, thereby reducing computational complexity and manual operation time. Further, the uniformity compensated image layer 15 can be overlaid on some display regions with severe color tone offsets. Any reasonable modification of step S601 to step S606 falls into the scope of the present invention. In the system 100, a line of sight of the human eyes can penetrate through the translucent uniformity compensated image layer 15 to the raw image layer 16. Therefore, even if color tones of the raw image layers generated by the displays with different manufacturing processes or different configurations are shifted, the human eyes 14 can receive the displayed images having uniform color tones since an appropriate uniformity compensation image layer is used for adjusting the color tones of each displayed image.

To sum up, the present invention discloses a method and a system for adjusting uniformity of image color tones. The method for adjusting the uniformity of image color tones can be performed by the system with an assisting application program. The method for adjusting the uniformity of image color tones can use a translucent uniformity compensated image layer for overlaying on a raw image layer of the display. Therefore, even if color tones of the raw image layers are non-uniform, the human eyes can receive an image layer with uniform color tones by overlaying the uniformity compensated image layer on the raw image layer. Therefore, a quality of visual experience can be improved. In practice, a maximum brightness difference of the displayed images can be reduced from 22.01% to 8.17%. A maximum color temperature coordinate error (i.e., in form of a Delta-E (2000) format, denoted as a total color temperature coordinate difference within some neighbor color segments) of the displayed images can be reduced from 9.05 to 2.52. In other words, the system can reduce the maximum brightness difference of the displayed images to lower than 10%. The system can reduce the maximum color temperature coordinate error of the displayed images to lower than Delta-E(2000)=4. Therefore, the method and the system for adjusting the uniformity of image color tones can greatly improve brightness uniformity and color temperature coordinate uniformity of the displayed images, thereby improving the quality of visual experience. Further, since the system for adjusting the uniformity of image color tones can generate the displayed image with uniform color tones by using the application program, no additional hardware or circuit component is required. Therefore, the system for adjusting the uniformity of image color tones can be applied to any display architecture.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for adjusting uniformity of image color tones comprising:
   setting brightness of a darkest display region of at least one part of display regions of a display as target brightness by a processor;
   setting color temperature coordinates of a designated display region of the at least one part of display regions of the display as target color temperature coordinates by the processor;
   comparing the brightness and the color temperature coordinates of the at least one part of display regions with the target brightness and the target color temperature coordinates for generating a first calibrated color tone by the processor;
   generating a second calibrated color tone of the at least one part of display regions by using a transfer function according to an Alpha channel parameter and the first calibrated color tone by the processor;
   generating a uniformity compensated image layer of all pixels of the at least one part of display regions according to a plurality of second calibrated color tones by the processor; and
   virtually overlaying the uniformity compensated image layer on the at least one part of display regions for generating a displayed image with uniform color tones on the at least one part of display regions by the processor.

2. The method of claim 1, further comprising:
   acquiring brightness and color temperature coordinates of each display region of the at least one part of display regions.

3. The method of claim 2, wherein the brightness and the color temperature coordinates of the each display region are located in a color space defined by an International Commission on Illumination (CIE color space), the first calibrated color tone and the second calibrated color tone are located in a color space of three primary colors (RGB color space), and the designated display region is a center display region of the display.

4. The method of claim 1, further comprising:
   generating at least one testing image of each display region; and
   generating brightness and color temperature coordinates of the each display region according to a testing result of the least one testing image;
   wherein the at least one testing image corresponds to at least one color combination of three primary colors, and the testing result of the least one testing image is converted to the brightness and the color temperature coordinates of the each display region by using a linear function or a non-linear function.

5. The method of claim 1, further comprising:
   using an average interpolation process for generating calibrated values of all pixels of the at least one part of display regions after all first calibrated color tones of the at least one part of display regions are generated; and
   saving the calibrated values of all pixels of the at least one part of display regions as a calibrated image layer.

6. The method of claim 5, further comprising:
   adjusting transparency of the calibrated image layer according to the Alpha channel parameter for generating the uniformity compensated image layer;
   wherein the Alpha channel parameter is defined as a maximum difference between a plurality of color coordinates and white color coordinates, and the plurality of color coordinates corresponds to all first calibrated color tones of the at least one part of display regions.

7. The method of claim 1, wherein the second calibrated color tone is generated in a form of:

$$(R_{OUT}, G_{OUT}, B_{OUT}) = \frac{(R_{IN}, G_{IN}, B_{IN}) - 255 \times [(255 - \alpha)/255]}{1 - [(255 - \alpha)/255]}$$

$(R_{IN}, G_{IN}, B_{IN})$ is the first calibrated color tone, $\alpha$ is the Alpha channel parameter, and $(R_{OUT}, G_{OUT}, B_{OUT})$ is the second calibrated color tone.

8. The method of claim 7, wherein the Alpha channel parameter falls into a range from 0 to 255, and the uniformity compensated image layer has an image format of Portable Network Graphics (PNG) with the Alpha channel parameter.

9. The method of claim 1, wherein the uniformity compensated image layer is a translucent mask generated by using an application program.

10. The method of claim 1, further comprising:
setting M intervals of a display panel of the display in a horizontal direction; and
setting N intervals of the display panel of the display in a vertical direction;
wherein the M intervals in the horizontal direction and the N intervals in the vertical direction are used for partitioning the display panel into M×N display regions, M and N are two positive integers greater than one, and each display region of the at least one part of display regions is a rectangular region.

11. A system for adjusting uniformity of image color tones comprising:
a display configured to display images;
an optical sensor configured to detect a plurality of optical characteristics of at least one part of display regions of the display; and
a processor coupled to the display and the optical sensor and configured to adjust the uniformity of the image color tones of the at least one part of display regions according to the plurality of optical characteristics of the at least one part of display regions;
wherein the processor sets brightness of a darkest display region of the at least one part of display regions of the display as target brightness, sets color temperature coordinates of a designated display region of the at least one part of display regions of the display as target color temperature coordinates, compares the brightness and the color temperature coordinates of the at least one part of display regions with the target brightness and the target color temperature coordinates for generating a first calibrated color tone, generates a second calibrated color tone of the at least one part of display regions by using a transfer function according to an Alpha channel parameter and the first calibrated color tone, generates a uniformity compensated image layer of all pixels of the at least one part of display regions according to a plurality of second calibrated color tones, and virtually overlays the uniformity compensated image layer on the at least one part of display regions for generating a displayed image with uniform color tones on the at least one part of display regions.

12. The system of claim 11, wherein the optical sensor acquires brightness and color temperature coordinates of the each display region of the at least one part of display regions.

13. The system of claim 12, wherein the brightness and the color temperature coordinates of the each display region are located in a color space defined by an International Commission on Illumination (CIE color space), the first calibrated color tone and the second calibrated color tone are located in a color space of three primary colors (RGB color space), and the designated display region is a center display region of the display.

14. The system of claim 11, wherein the processor controls the display to generate at least one testing image of each display region, after the at least one testing image is generated, the processor generates brightness and color temperature coordinates of the each display region according to a testing result of the least one testing image, the at least one testing image corresponds to at least one color combination of three primary colors, and the testing result of the least one testing image is converted to the brightness and the color temperature coordinates of the each display region by using a linear function or a non-linear function.

15. The system of claim 11, wherein the processor uses an average interpolation process for generating calibrated values of all pixels of the at least one part of display regions after all first calibrated color tones of the at least one part of display regions are generated, and the processor saves the calibrated values of all pixels of the at least one part of display regions as a calibrated image layer.

16. The system of claim 15, wherein the processor adjusts transparency of the calibrated image layer according to the Alpha channel parameter for generating the uniformity compensated image layer, the Alpha channel parameter is defined as a maximum difference between a plurality of color coordinates and white color coordinates, and the plurality of color coordinates corresponds to all first calibrated color tones of the at least one part of display regions.

17. The system of claim 11, wherein the second calibrated color tone is generated in a form of:

$$(R_{OUT}, G_{OUT}, B_{OUT}) = \frac{(R_{IN}, G_{IN}, B_{IN}) - 255 \times [(255 - \alpha)/255]}{1 - [(255 - \alpha)/255]}$$

$(R_{IN}, G_{IN}, B_{IN})$ is the first calibrated color tone, α is the Alpha channel parameter, and $(R_{OUT}, G_{OUT}, B_{OUT})$ is the second calibrated color tone.

18. The system of claim 17, wherein the Alpha channel parameter falls into a range from 0 to 255, and the uniformity compensated image layer has an image format of Portable Network Graphics (PNG) with the Alpha channel parameter.

19. The system of claim 11, further comprising:
a memory coupled to the processor and configured to save data of an application program;
wherein the uniformity compensated image layer is a translucent mask generated by the processor through the application program.

20. The system of claim 19, wherein the memory further saves data of an operating system, the application program is executed under the operating system, and the operating system comprises a computer operating system or a smartphone operating system.

21. The system of claim 11, wherein data communications are performed between the optical sensor and the processor through a cable, the cable is a universal serial bus (USB) adapter cable or an RS232 data format adapter cable, and the optical sensor is a color analyzer with software development kits (SDK) or an optical measuring instrument capable of generating color coordinates in a color space defined by an International Commission on Illumination (CIE color space).

22. The system of claim 11, wherein the processor sets M intervals of a display panel of the display in a horizontal direction, sets N intervals of the display panel of the display in a vertical direction, the M intervals in the horizontal direction and the N intervals in the vertical direction are used for partitioning the display panel into M×N display regions, M and N are two positive integers greater than one, and each display region of the at least one part of display regions is a rectangular region.

* * * * *